(12) United States Patent
Ambroladze et al.

(10) Patent No.: US 8,671,267 B2
(45) Date of Patent: Mar. 11, 2014

(54) MONITORING PROCESSING TIME IN A SHARED PIPELINE (75) Inventors: Ekaterina M. Ambroladze, Wappingers Falls, NY (US); Deanna Postles Dunn Berger, Poughkeepsie, NY (US); Michael Fee, Cold Spring, NY (US); Christine C. Jones, Poughkeepsie, NY (US); Arthur J. O'Neill, Jr., Poughkeepsie, NY (US); Diana Lynn Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 12/822,359

(22) Filed: Jun. 24, 2010

(65) Prior Publication Data

US 2011/0320779 A1    Dec. 29, 2011

(51) Int. Cl.
G06F 9/30 (2006.01)
G06F 9/40 (2006.01)
G06F 13/00 (2006.01)
G06F 3/00 (2006.01)

(52) U.S. Cl.
USPC .............................. 712/220; 710/18; 711/121

(58) Field of Classification Search
None
See application file for complete search history.

(56) References Cited

U.S. PATENT DOCUMENTS

| 5,226,144 | A  | * | 7/1993 | Moriwaki et al. | ............ 711/121 |
| 6,018,759 | A  | * | 1/2000 | Doing et al. | .................. 718/108 |
| 6,851,064 | B2 |   | 2/2005 | Ku et al. |  |
| 7,051,177 | B2 |   | 5/2006 | Le et al. |  |
| 7,577,770 | B2 |   | 8/2009 | Tanaka et al. |  |
| 2008/0071939 | A1 | * | 3/2008 | Tanaka et al. | ................... 710/18 |

* cited by examiner

*Primary Examiner* — Andrew Caldwell
*Assistant Examiner* — William B Partridge
(74) *Attorney, Agent, or Firm* — Cantor Colburn LLP; John Campbell (57) ABSTRACT

A pipelined processing device includes: a device controller configured to receive a request to perform an operation; a plurality of subcontrollers configured to receive at least one instruction associated with the operation, each of the plurality of subcontrollers including a counter configured to generate an active time value indicating at least a portion of a time taken to process the at least one instruction; a pipeline processor configured to receive and process the at least one instruction, the pipeline processor configured to receive the active time value; and a shared pipeline storage area configured to store the active time value for each of the plurality of subcontrollers.

20 Claims, 9 Drawing Sheets

MONITORING PROCESSING TIME IN A SHARED PIPELINE

BACKGROUND

Exemplary embodiments relate generally to pipelined data transfer operations, and particularly to systems and methods for monitoring performance in a shared pipeline.

In computing, a pipeline may be considered as a set of data processing elements connected in series, so that the output of one element is the input of the next one. The elements of a pipeline are often executed in parallel or in time-sliced fashion; in that case, some amount of buffer storage is often inserted between elements.

Further, an instruction pipeline is a technique used in the design of computers and other digital electronic devices to increase their instruction throughput (the number of instructions that can be executed in a unit of time). Pipelining involves splitting the processing of a computer instruction into a series of independent steps, with storage at the end of each step. This allows the computer's control circuitry to issue instructions at the processing rate of the slowest step, which is much faster than the time needed to perform all steps at once.

It is frequently the case, for example with early hardware prototypes, that performance characteristics of the system fall short of expectations. Finding out the root cause of performance degradation, e.g., why a pipelined operation is taking longer than expected, is important in improving performance. Often, a processing entity such as a cache controller includes multiple controllers or subcomponents that are responsible for executing different instructions that make up an operation. Caches are typically equipped with a coarse grained counter that measures the time taken between receiving or initiating an operation and operation completion. This counter may be used to indicate that the operation is not making progress and when it is deemed to be truly hung. Tracking down the root of the problem is challenging because often there is not enough information to pinpoint the areas of the controller design that are responsible for the performance degradation.

BRIEF SUMMARY

An exemplary embodiment includes a pipelined processing device. The device includes: a device controller configured to receive a request to perform an operation; a plurality of subcontrollers configured to receive at least one instruction associated with the operation, each of the plurality of subcontrollers including a counter configured to generate an active time value indicating at least a portion of a time taken to process the at least one instruction; a pipeline processor configured to receive and process the at least one instruction, the pipeline processor configured to receive the active time value; and a shared pipeline storage area configured to store the active time value for each of the plurality of subcontrollers.

Another exemplary embodiment includes a method of monitoring a pipelined processing device. The method includes: receiving a request to perform an operation at a device controller; sending at least one instruction associated with the operation to each of a plurality of subcontrollers, each of the plurality of subcontrollers including a counter; receiving the at least one instruction at a pipeline processor and processing the at least one instruction via the pipeline processor; generating an active time value by the counter indicating at least a portion of a time taken to process the at least one instruction; and sending the active time value from the counter to a shared pipeline storage area configured to store the active time value for each of the plurality of subcontrollers.

A further embodiment includes a computer program product for monitoring a pipelined processing device, including a tangible storage medium readable by a processing circuit and storing instructions for execution by the processing circuit for performing a method including: receiving a request to perform an operation at a device controller; sending at least one instruction associated with the operation to each of a plurality of subcontrollers, each of the plurality of subcontrollers including a counter; receiving the at least one instruction at a pipeline processor and processing the at least one instruction via the pipeline processor; generating an active time value by the counter indicating at least a portion of a time taken to process the at least one instruction; and sending the active time value from the counter to a shared pipeline storage area configured to store the active time value for each of the plurality of subcontrollers.

Additional features and details are realized through the techniques of the present invention. Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

The systems and methods described herein provide a fine-grained, per operation performance tracking mechanism that allows for precise measurement of system performance. The systems and methods allow for measurement of performance of each controller or area in the system that participate in an operation, by measuring the amount of time each controller or area takes to perform its part of the operation. This performance tracking mechanism can aid in system performance evaluation and debugging by highlighting precisely the area(s) of the system taking the most time. In one embodiment, a processing system or system component, such as a central processor or cache, includes a controller and a plurality of subcontrollers connected to a pipeline. Each subcontroller is equipped with a timer or counter to measure the amount of time each subcontroller is active in the pipeline during execution of an input/output (I/O) or other operation.

Figure 1:
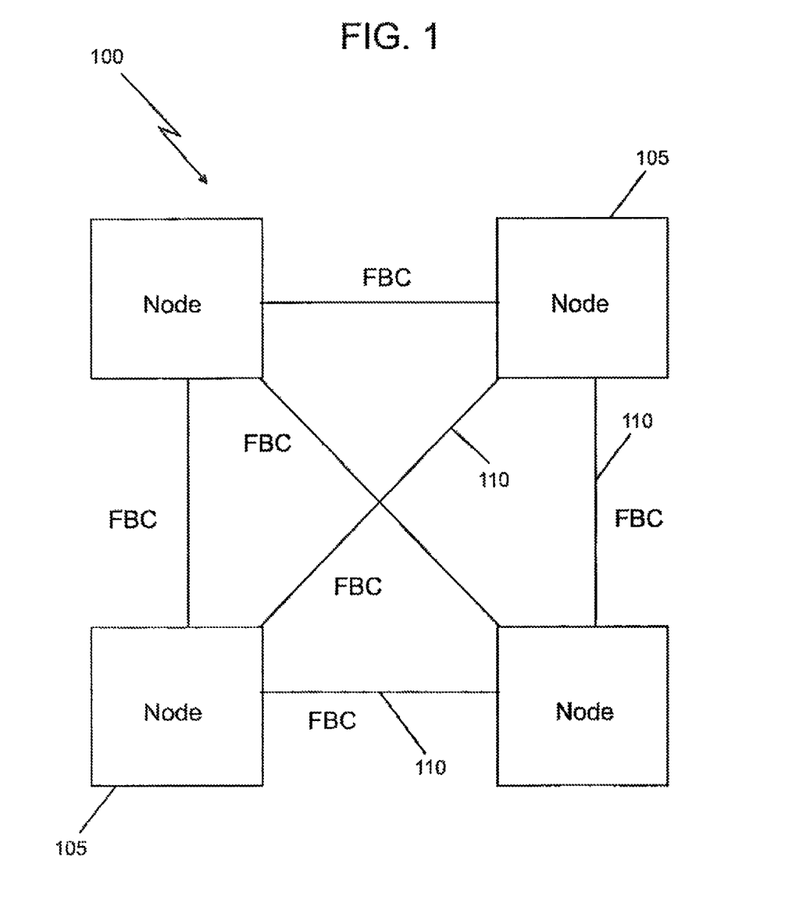
FIG. 1 depicts an exemplary embodiment of a computing, processing and/or data management network.

FIG. 1 illustrates an exemplary embodiment of a computing, processing and/or data management system 100 such as a storage area network. The system 100 includes multiple nodes 105 connected in communication with one another via suitable connectors 110 such as wires, cables and optical fibers. The nodes 105 may be any processing and/or storage system such as a computer, server, data center, cache system or mainframe computer. The connectors 110 may include any of various connectors, ports, switches and other devices, and with the nodes 105 form a network or fabric. In the embodiment shown in FIG. 1, the connectors 110 are configured as fabric connectors (FBC).

Figure 2:
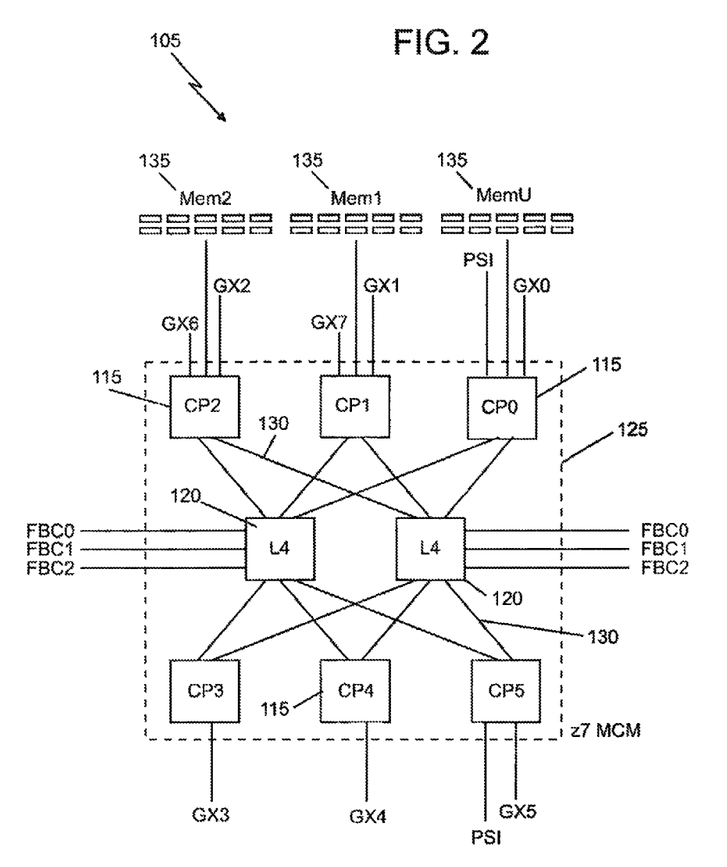
FIG. 2 depicts a data storage system in accordance with exemplary embodiments.

FIG. 2 illustrates an exemplary data storage system having a cache topology that may form all or part of a node 105. A plurality of central processors (CP) 115 (also referred to as central processing units) are operatively connected via busses to one or more level 4 (L4) caches 120. In one embodiment, the CPs 115 and the L4 caches 120 are integrated in a package such as a multi-chip module (MCM) 125 and connected via conductors 130. In one example, the MCM 125 is a component of a data center, mainframe, server or other data storage device. In this embodiment, the MCM 125 may be connected to memory devices 135 such as disk drives or tape drives. The MCM 125 may also be connected in communication with other nodes 105 via fabric connectors, channels and/or other connectors 110. The central processors and caches are not limited to the embodiments described herein, and may be any type of processing and/or storage component such as a microprocessor, memory area and/or logical entity.

Figure 3:
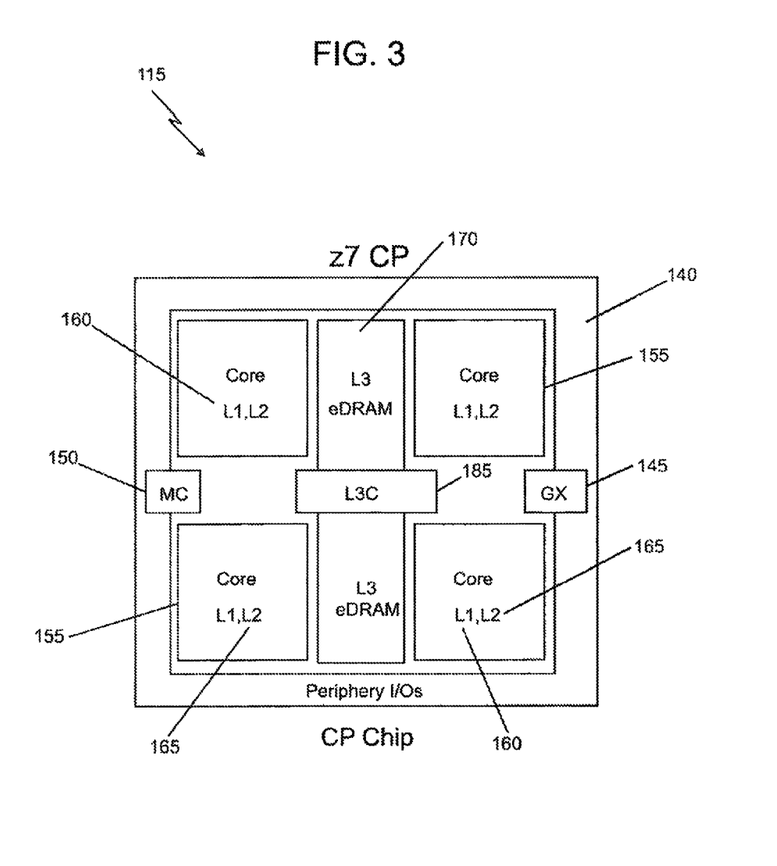
FIG. 3 depicts an exemplary embodiment of a processor of the data storage system of FIG. 2.
Figure 4:
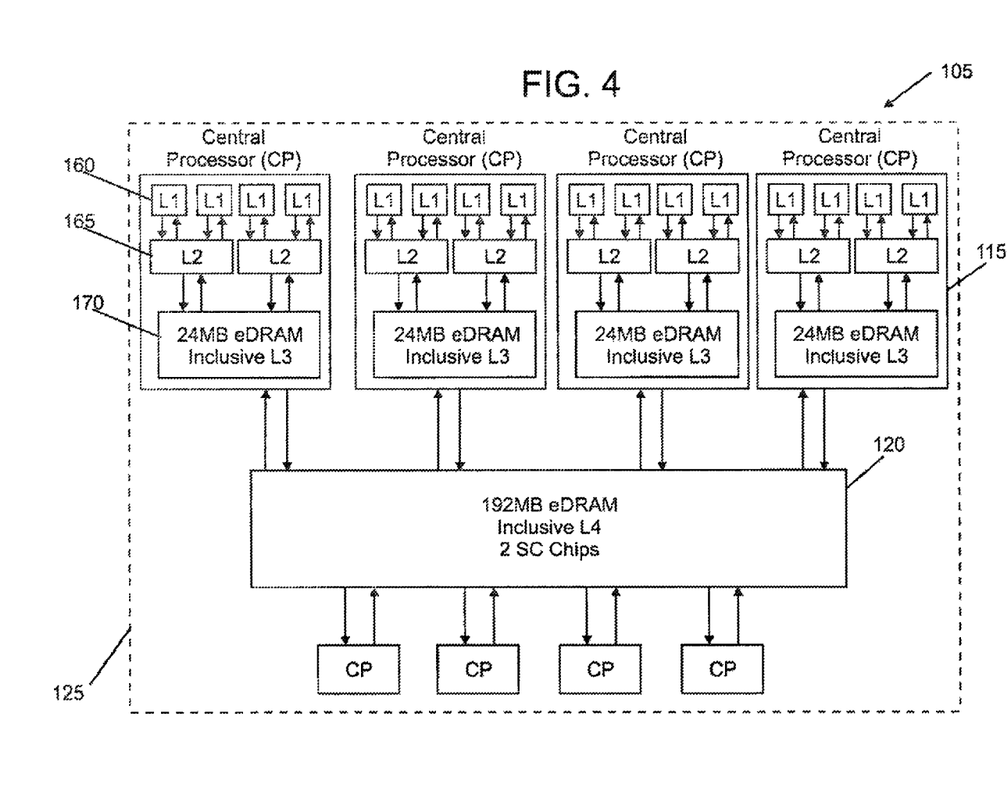
FIG. 4 depicts a block diagram showing components of the data storage system of FIG. 2.

Referring to in FIGS. 3 and 4, the CP 115 may include additional components to facilitate functions such as processing, communication and data transfer, such as I/O devices 140 which may include input devices (or peripherals) and/or output devices (or peripherals), an I/O port 145 and a memory controller unit 150. The I/O devices 140 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 140 also include components for communicating over various networks, such as the Internet or an intranet.

In one embodiment, each of the central processors (CP) 115 includes one or more cores 155 which perform the reading and executing of instructions. On each central processor (CP) 105, the cores 155 are operatively connected via busses to one or more level 1 (L1) caches 160, one or more level 2 (L2) caches 165, and at least one level 3 (L3) cache 170 as understood by one skilled in the art. The L1 caches 160 are physically closest to the cores 155, followed by the L2 caches 165, and then the L3 caches 170. In the example shown in FIG. 3, each individual central processor 115 is fabricated on its own separate chip which includes the L1 caches 160, the L2 caches 165, and the L3 caches 170, and the L4 caches 120 are fabricated on their own separate chips. Although the L3 caches 170 and the L4 caches 120 are shown as including embedded dynamic random access memory (DRAM), which is referred to as eDRAM, it is understood that any other types of suitable memory such as DRAM may be utilized.

Figure 5:
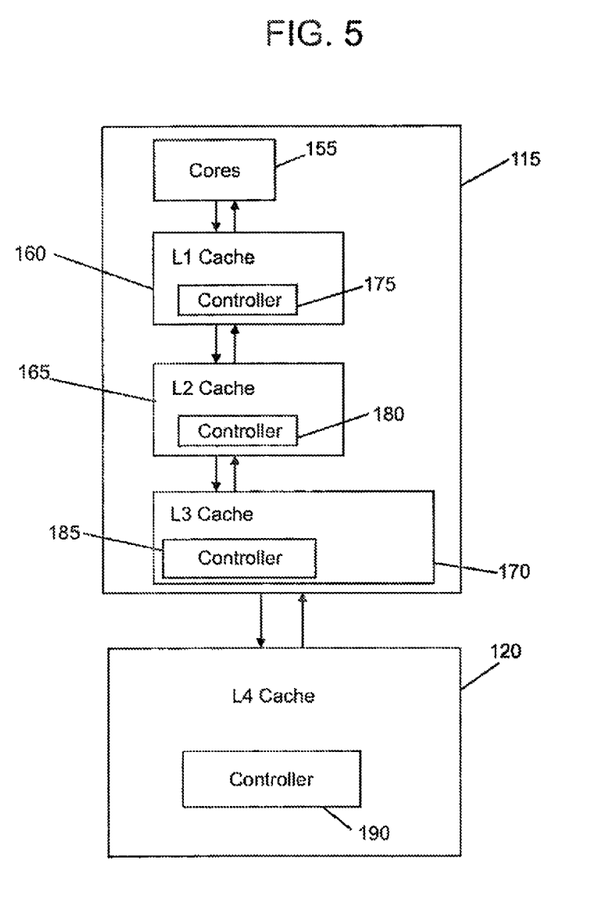
FIG. 5 depicts a block diagram showing components of the data storage system of FIG. 2.

Referring to FIG. 5, in one embodiment, one or more of the L1 caches 160, the L2 caches 165, the L3 cache 170 and the L4 caches 120 include their own respective cache controllers 175, 180, 185 and 190 for controlling various operations such as sending, receiving, and executing requests (also referred to as request signals).

Figure 6A:
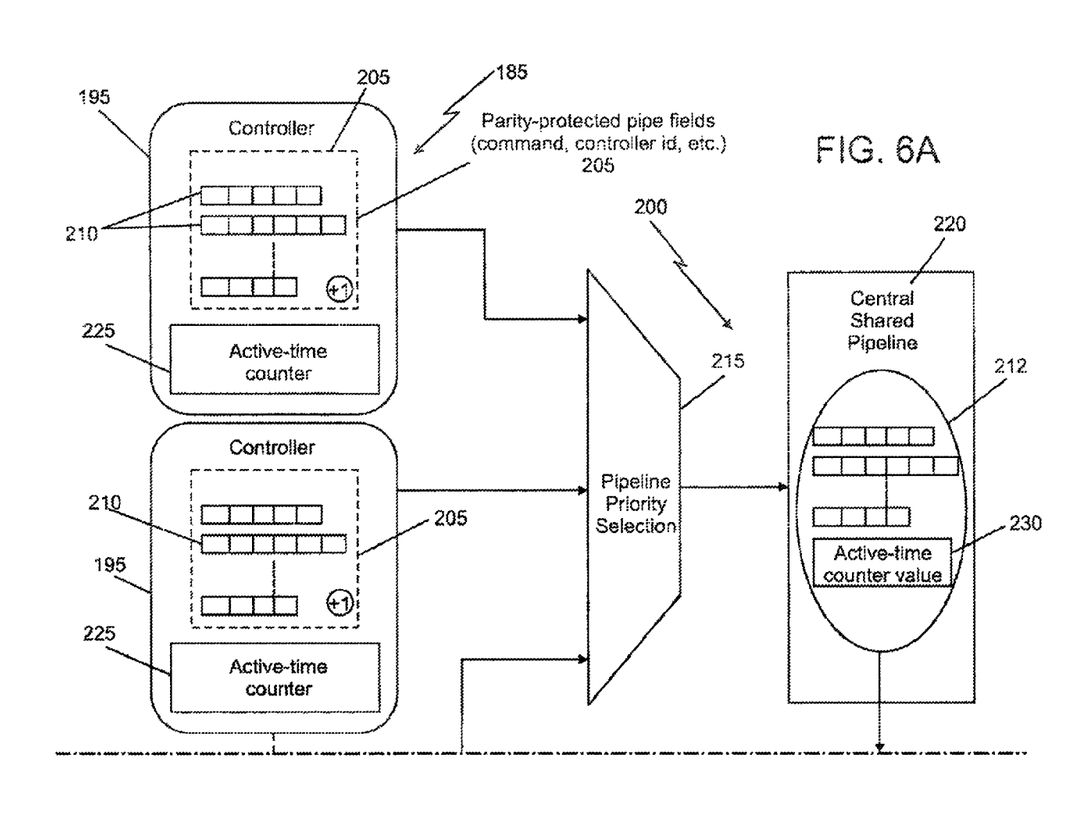
FIG. 6A and FIG. 6B depicts a pipelined processing device including a controller and a plurality of subcontrollers.
Figure 6B:
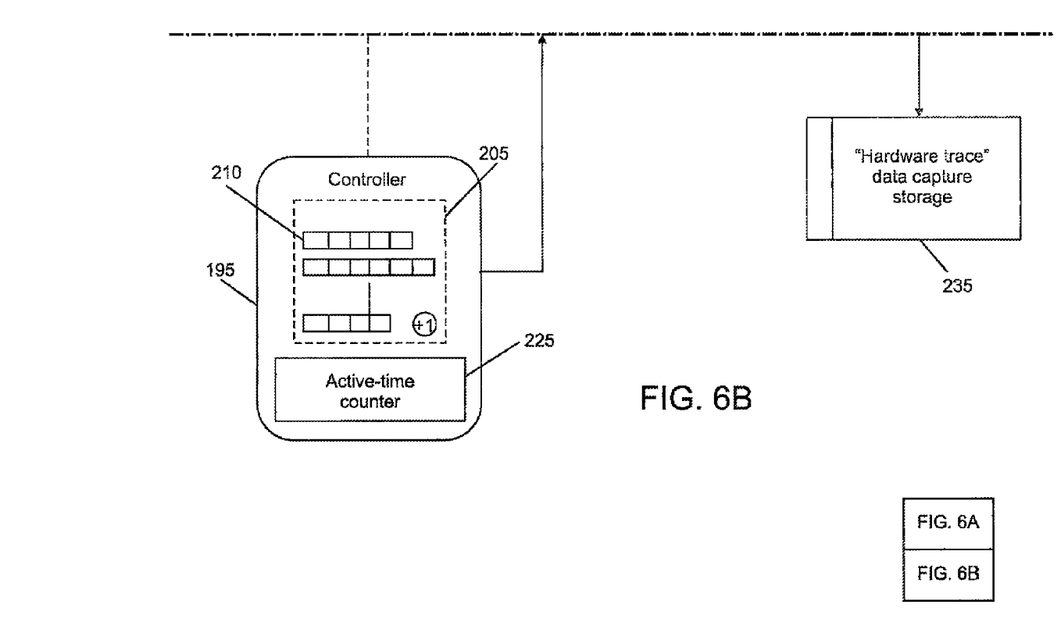

An embodiment of a processing system is shown in FIG. 6. Although this embodiment is described in conjunction with the L3 cache 170, the embodiment is not so limited. The processing system may be cache such as the L1 cache 160, the L2 cache 165, the L4 cache 120, or any other data storage, transfer and/or processing device.

The L3 cache controller 185 includes a plurality of subcontrollers 195, each of which is connected to a pipeline processing system 200 including a pipeline processor 220. Each subcontroller 195 is configured to perform a specific processing function within the cache controller 185, such as receiving commands, forwarding commands, accessing the cache memory, receiving and forwarding commands from an I/O port, updating protocols, generating alerts and others. Various subcontrollers 195 are utilized during an operation that is executed in response to a request from a component of the network 100.

Each subcontroller 195 includes or is associated with a memory or memory area 205 (i.e., subcontroller memory) that can hold various instructions 210 for performing various processing functions during execution of an operation, which are to be processed in a pipeline 212. The subcontroller memory 205 may include a number of registers or other memory structures to hold the instructions 210. In one embodiment, each register or subcontroller memory 205 includes a number of pipe fields holding various instructions or command data. Examples include command fields, controller identification fields, source and target identification fields and others.

In one embodiment, the pipeline processing system 200 includes an arbiter 215 configured to decide access and control the input of successive instructions 210 into the pipeline controller 220 and the pipeline 212. The arbiter 215 and/or the pipeline controller 220, in one embodiment, inputs successive instructions 210 into the pipeline 212 in response to pulse signals from a clock, corresponding to clock cycles. A new instruction 210 may be input into the pipeline 212 at the start of each clock cycle Each subcontroller 195 in the controller 185 includes a timer 225, such as a clock or a counter, referred to herein as an active-time counter 225, that is configured to be activated or started and measure a time during which an associated subcontroller 195 is active, i.e., between the time when the subcontroller 195 received request data and/or instruction(s) 210 and the time when all the instructions 210 associated with the request have been processed in the pipeline 12. For example, each active-time counter 225 includes an 8-bit counter associated with a respective subcontroller 195, which increments as long as the subcontroller 195 is active. In one embodiment, the counter 225 does not wrap and resets to zero each time the subcontroller 195 goes inactive. In this manner, while the subcontroller 195 is active, the counter 225 always either holds a maximum value or reflects the time the subcontroller 195 has been active.

In one embodiment, the active-time counter 225 is incremented periodically, such as at the start of each clock cycle. The active-time counter 225 may be adjusted to adjust the granularity of the times captured. For example, the active-time counter 225 may be incremented in conjunction with a signal such as a programmable count pulse, and is configured to increment during the time period defined by the count pulse. In one embodiment, each pulse duration is selected to be than or greater than the clock cycle and/or less than the active time of the subcontroller 195, so that timer values are collected over smaller time implements than the clock cycles or active time if desired. The active-time counter 225 may thus reflect the time the subcontroller 195 has been active with respect to clock cycles, programmable count pulses or any other selected time window. In this way, controller performance data granularity can be modified as need, so that the performance of the controller 195 over various selected time windows during the active time can be recorded.

In one embodiment, the pipeline controller 220 includes at least one memory area or active time counter 230 (i.e., pipeline counters) associated with or connected to the pipeline controller 220. The pipeline counter 230 is configured to receive the time values from each active-time counter 225 and associated subcontroller 195 and store the time values for later retrieval and/or analysis. For example, the pipeline counter 230 includes at least one active-time counter array, shared pipeline register, data collection or other storage 230 configured to receive the timer data from each subcontroller 195. In one embodiment, the pipeline counter 230 has the function of feeding the controller active time data to a collection mechanism 235.

In one embodiment, the timer data is sent to the collection mechanism 235 via the pipeline counter. The collection mechanism may be any memory area or data structure, such as a pipeline data storage area (e.g., a pipeline data array) that can store the active-time counter data along with other data generated in the pipeline during pipeline processing.

Figure 7:
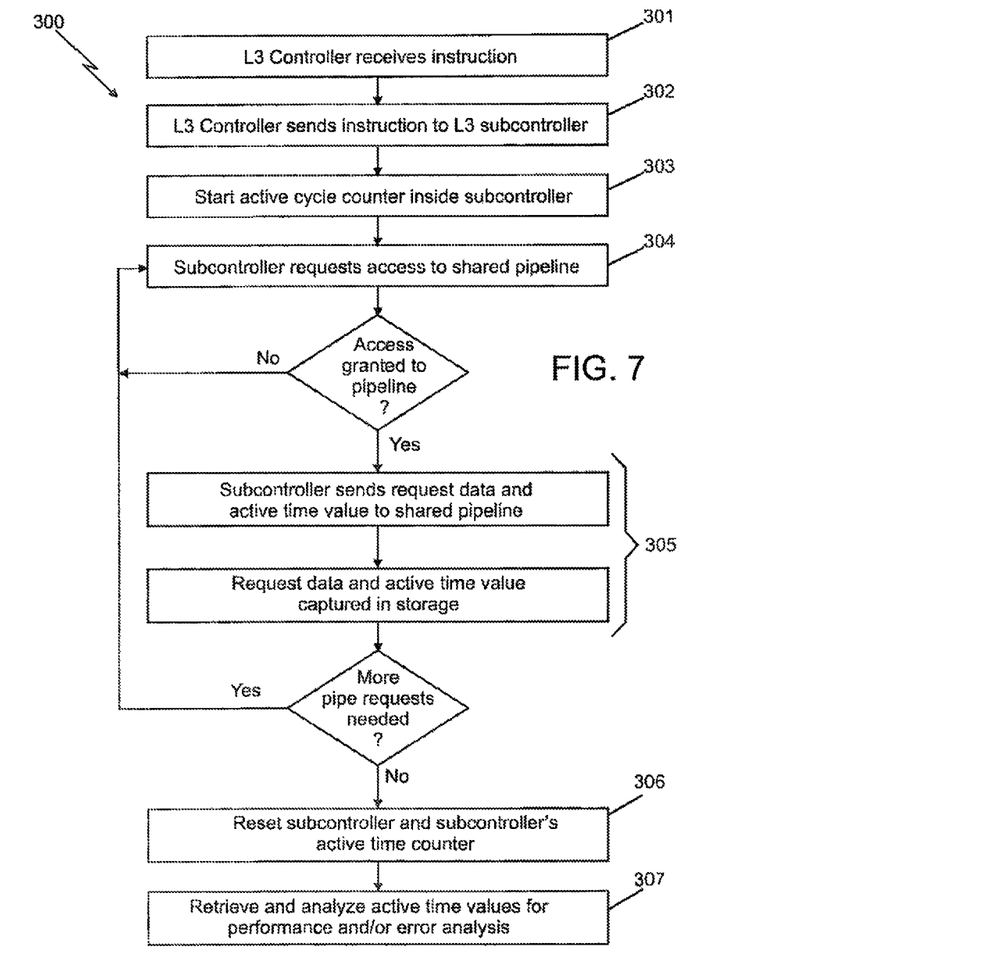
FIG. 7 depicts a method of pipeline processing a requested operation.

FIG. 7 illustrates a method 300 of managing a pipeline, detecting errors in a pipeline and/or performing recovery actions for a pipeline. The method 300 includes one or more stages 301-305. Although the method 300 is described in conjunction with the L3C controller 185, the method 300 can be utilized in conjunction with any of the components and caches described herein, as well as with any device or system that utilizes pipeline processing.

In the first stage 301, the L3C controller 185 receives a request such as a data transfer request, i.e., a request to transfer data sent from a source location, such as a node, cache, processing unit or other component or remote device, to a destination location, such as the L3 cache 170. The requestors may be, for example, the cache 170, the L4 caches 120, the L2 caches 165, the L1 caches 160, the cores 155, and other nodes 105. Such requestors may be on the same and/or different central processors 115.

In the second stage 302, request data is sent to one or more of the subcontrollers 195 as instructions 210 and is stored within each subcontroller 195 for pipeline processing.

In the third stage 303, the active-time counter 225 is started in response receiving the instructions 210 and increments at least until the instruction 210 completes its course in the pipeline. The active-time counter 225 increments based on selected pulses, and the counter 225 increments for each pulse. The pulses may correspond to the clock cycle or otherwise correspond to other programmed time periods making up all or a part of the active time of the subcontroller 195.

In the fourth stage 304, the subcontroller 195 requests access to the shared pipeline 212.

In the fifth stage 305, if access is granted via, for example, the arbiter 215, in a first clock cycle, the pipeline controller 220 fetches a first instruction 210 from a subcontroller 195. The subcontroller 195 send the instruction and associated data along with the value of the active-time counter 225 (i.e., the active time value) to the pipeline 212. The instruction 210 enters the pipeline controller 220 and the instruction information proceeds through the pipeline 212. The subcontroller 195 sends the active-time value from the counter 225 to the shared pipeline counter. The active time value is received by the pipeline counter 230 and is sent to the collection mechanism 235. The instruction 210 is processed via the pipeline and the results are written back to the subcontroller 195 (e.g., from the collection mechanism 235) or a message is provided to the subcontroller 195 to indicate that the instruction 210 has completed processing.

Stages 304 and 305 are repeated for each instruction 210 input into the pipeline 212 until the pipelined processing is complete and no more pipe requests are needed by the subcontroller 195. During these stages, the active time counter 225 continues to increment, and time values are sent to the pipeline 12 at each time that an instruction 210 is sent to the pipeline 212, i.e., each time the subcontroller 195 makes a pipe pass. Each active-time value may be then routed from the pipeline counter 230 register to the collection mechanism 235 or other storage area or array reserved for data collection.

In the sixth stage 306, the subcontroller 195 is re-set and ends the active-time counter 225 when the instruction processing is complete, i.e., when each instruction 210 that was sent to the subcontroller has been processed in the pipeline 212.

In the seventh stage 307, in one embodiment, the collection mechanism 235 is read out and the time data may be analyzed for hardware failure or performance analysis. For example, the total time of the operation performed by the cache is determined and compared to a target time. If the total time is unsatisfactory, or if the performance is otherwise desired to be analyzed, each time value associated with processing each instruction 210 can be analyzed to determine the time each subcontroller took for each instruction. Since an active time count is captured every time the controller performs a step of an operation, it provides a mechanism to record the total active time for each overall sequence as well as the time between each portion of a sequence. The analysis may also include analyzing the time values for debugging hardware hang fails to diagnose the hardware hang fail.

The systems and methods described herein provide numerous advantages over prior art dataflow systems. Technical effects and benefits include providing a mechanism for fine-grained timing of controllers within a processor, to allow for precise measurement of processor performance and the performance of individual components. In addition, because the functionality described herein may be added to an already existing shared pipeline active-time counter, the additional functionality may be included with minimal additional area or power consumption.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
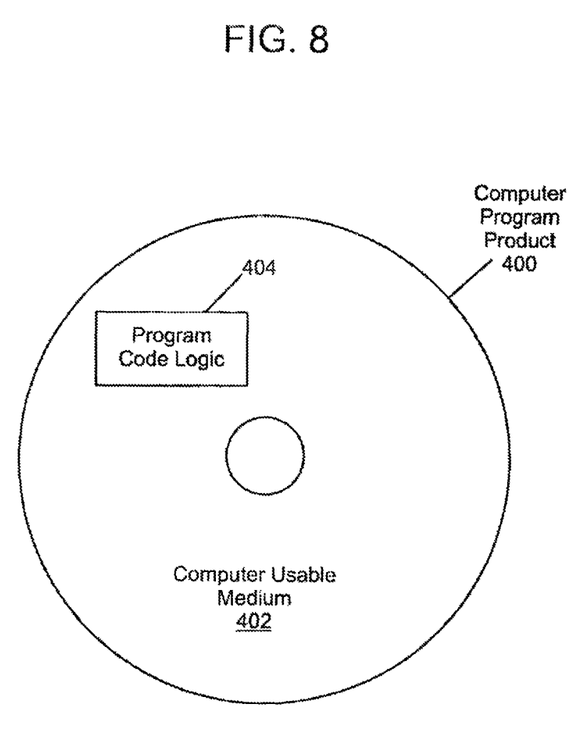
FIG. 8 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. An example of a computer program product 400 as depicted in FIG. 8 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A pipelined processing device, comprising:
    a device controller configured to receive a request to perform an operation and transmit request data from the request as a plurality of instructions;
    a plurality of subcontrollers, each of the plurality of subcontrollers configured to receive at least one instruction of the plurality of instructions associated with the operation, each of the plurality of subcontrollers including a counter configured to generate an active time value indicating at least a portion of a time taken to process the at least one instruction;
    a pipeline processor configured to receive the at least one instruction and process the at least one instruction, the pipeline processor configured to receive the active time value; and
    a shared pipeline storage area configured to store the active time value for each of the plurality of subcontrollers.

2. The device of claim 1, wherein the shared pipeline storage area is configured to store data generated by the pipeline processor in processing the at least one instruction.

3. The device of claim 1, further comprising a pipeline counter configured to receive the active time value and route the active time value to the shared pipeline storage area.

4. The device of claim 1, wherein the counter is configured to be incremented in response to at least one of a clock cycle pulse and a signal defining a selected time window.

5. The device of claim 4, wherein each of the plurality of subcontrollers is configured to send the active time value for the counter in response to the pipeline processor receiving the at least one instruction.

6. The device of claim 1, wherein the counter is configured to be started in response to an instruction being received by a respective subcontroller and measure a time period at least between receiving the instruction and completion of processing the instruction by the pipeline processor.

7. The device of claim 6, wherein each of the plurality of subcontrollers is configured to send the active time value from the counter in response to the completion of processing.

8. The device of claim 1, wherein the processing device includes a cache and the device controller includes a cache controller.

9. A method of monitoring a pipelined processing device, the method comprising:
    receiving a request to perform an operation at a device controller;
    sending, by the device controller, request data from the request as a plurality of instructions to a plurality of subcontrollers, wherein sending includes transmitting at least one instruction of the plurality of instructions associated with the operation to each of the plurality of subcontrollers, each of the plurality of subcontrollers including a counter;
    receiving the at least one instruction at a pipeline processor and processing the at least one instruction via the pipeline processor;
    generating an active time value by the counter indicating at least a portion of a time taken to process the at least one instruction; and
    sending the active time value from the counter to a shared pipeline storage area configured to store the active time value for each of the plurality of subcontrollers.

10. The method of claim 9, wherein sending the active time value includes routing the active time value to the shared pipeline storage area via a pipeline.

11. The method of claim 9, wherein generating the active time value includes incrementing the counter in response to at least one of a clock cycle pulse and a signal defining a selected time window.

12. The method of claim 11, wherein each of the plurality of subcontrollers is configured to send the active time value for the counter in response to the pipeline processor receiving the at least one instruction.

13. The method of claim 9, wherein generating the active time value includes starting the counter in response to receiving the instruction by a respective subcontroller and measuring a time period at least between starting the counter and completion of processing the at least one instruction by the pipeline processor.

14. The method of claim 13, wherein each of the plurality of subcontrollers is configured to send the active time value from the counter in response to the completion of processing.

15. The method of claim 9, wherein the processing device includes a cache and the device controller includes a cache controller.

16. A computer program product for monitoring a pipelined processing device, comprising a non-transitory storage medium readable by a processing circuit and storing instructions for execution by the processing circuit for performing a method comprising:
    receiving a request to perform an operation at a device controller;
    sending, by the device controller, request data from the request as a plurality of instructions to a plurality of subcontrollers, wherein sending includes transmitting at least one instruction associated with the operation to each of the plurality of subcontrollers, each of the plurality of subcontrollers including a counter;
    receiving the at least one instruction at a pipeline processor and processing the at least one instruction via the pipeline processor;
    generating an active time value by the counter indicating at least a portion of a time taken to process the at least one instruction; and
    sending the active time value from the counter to a shared pipeline storage area configured to store the active time value for each of the plurality of subcontrollers.

17. The computer program product of claim 16, wherein sending the active time value includes routing the active time value to the shared pipeline storage area via a pipeline.

18. The computer program product of claim 16, wherein generating the active time value includes incrementing the counter in response to at least one of a clock cycle pulse and a signal defining a selected time window.

19. The computer program product of claim 16, wherein generating the active time value includes starting the counter in response to receiving the instruction by a respective subcontroller and measuring a time period between starting the counter and completion of processing the at least one instruction by the pipeline processor.

20. The computer program product of claim 16, wherein the processing device includes a cache and the device controller includes a cache controller.

* * * * *